United States Patent
Selg et al.

[11] Patent Number: 6,116,535
[45] Date of Patent: Sep. 12, 2000

[54] TAPERED ROLLING TAPE EDGE GUIDE MECHANISM AND METHODS

[75] Inventors: Donald Wayne Selg, Westminster; Clark Milo Janssen, Loveland; Joseph Philip Falace, Louisville, all of Colo.

[73] Assignee: Storage Technology Corporation, Louisville, Colo.

[21] Appl. No.: 09/338,288

[22] Filed: Jun. 22, 1999

[51] Int. Cl.[7] .................................................. B65H 23/04
[52] U.S. Cl. ........................ 242/615.2; 242/346; 360/132
[58] Field of Search .................................. 242/342, 346, 242/548, 548.2, 566, 615, 615.1, 615.2, 615.3, 615.4; 360/130.21, 132

[56] References Cited

U.S. PATENT DOCUMENTS

| | | |
|---|---|---|
| 3,939,494 | 2/1976 | Okuda ............................ 242/615.1 X |
| 4,017,897 | 4/1977 | Blanding ........................... 242/615.3 X |
| 4,441,133 | 4/1984 | Ogawa et al. ....................... 242/615.2 |
| 5,173,828 | 12/1992 | Tanzer et al. . |
| 5,511,736 | 4/1996 | Miura ..................................... 242/346 |
| 5,610,787 | 3/1997 | Kunze et al. . |
| 5,772,143 | 6/1998 | Runyon et al. . |

*Primary Examiner*—Donald P. Walsh
*Assistant Examiner*—William A. Rivera
*Attorney, Agent, or Firm*—Brooks & Kushman P.C.

[57] ABSTRACT

A mechanism and method for guiding a tape across a transducer, and a method for making the mechanism. The mechanism has one rolling guide on either side of the transducer. Each guide has a tapered surface and a flange at one end of the tapered surface. Each tapered surface biases one edge of the tape against a flange to fix the tape's position in the transverse direction on opposite sides of the transducer. The taper of the first and second guides are oriented in opposite directions.

37 Claims, 4 Drawing Sheets

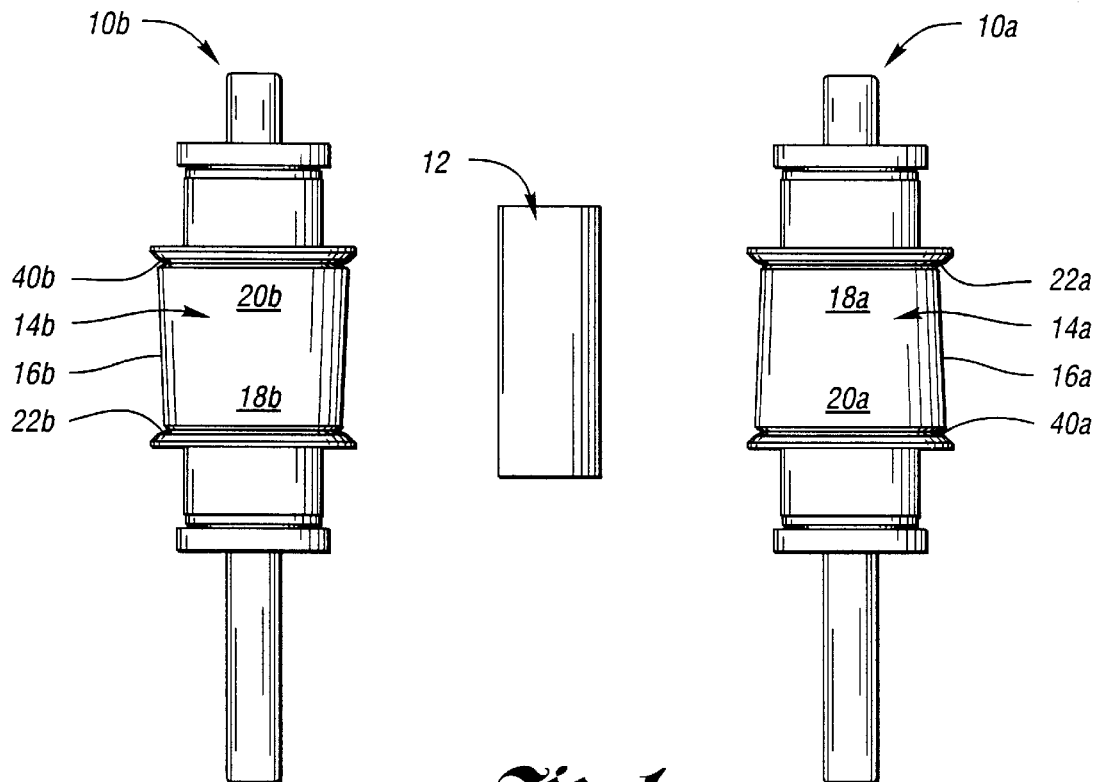
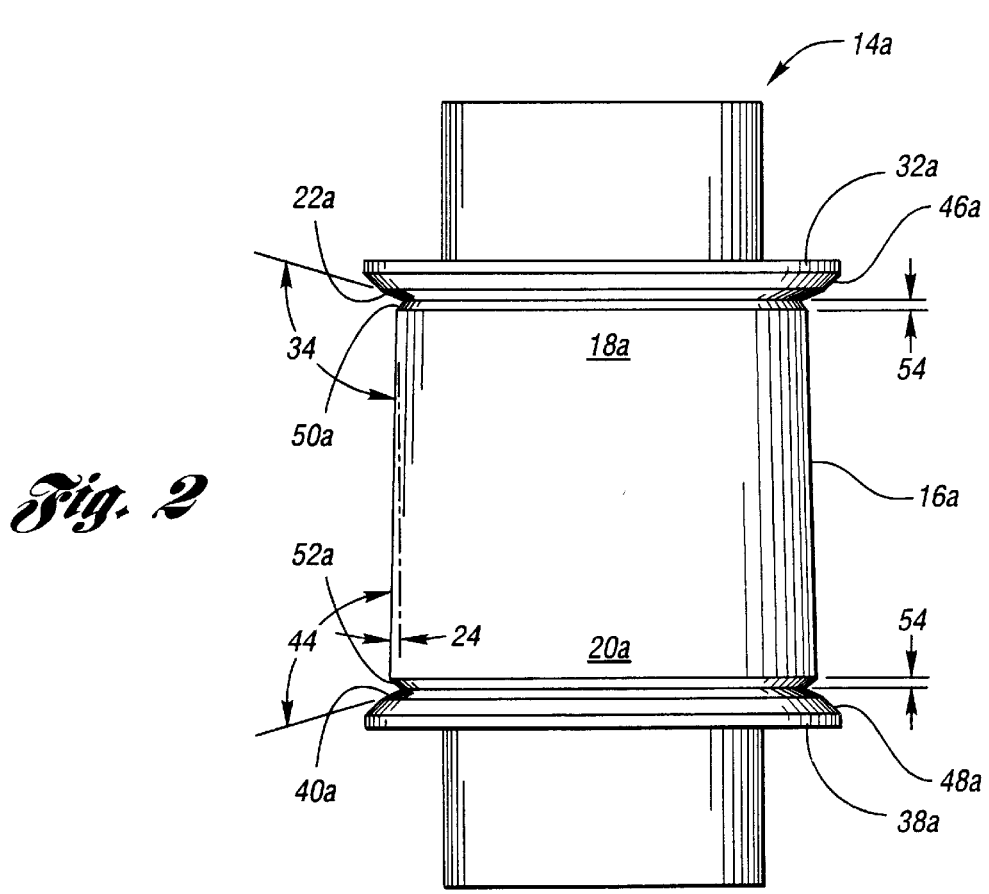

TAPERED ROLLING TAPE EDGE GUIDE MECHANISM AND METHODS

TECHNICAL FIELD

The present invention relates to the field of tape guide mechanisms having a pair of rolling tape guides that bias the edges of the tape against reference surfaces to provide accurate transverse positioning.

BACKGROUND ART

Magnetic tape is a widely used media for the storage of data. To write and read data to and from the tape, it is moved longitudinally past one or more magnetic transducers usually containing several read/write poles. To achieve higher data capacities, the industry is moving to thinner media that allows for longer tapes to reside in existing standardized cartridges, and the width of the data tracks have decreased to allow for more data tracks on a tape.

The thinner tapes require gentle mechanical support due to their flexibility. When the tape guides exert too much force against the tape edges, the tape can buckle or the edges will be subject to excessive wear. The tension across the tape must also be kept uniform. Otherwise, the tape will not exert enough pressure against the transducer resulting in poor read/write characteristics. In some applications, the tape path requires the guides to be in contact with the magnetic side of the tape. Where this happens, the guide-to-tape wear should be kept low to reduce the potential for damage to the magnetic layer and the data stored within.

The narrower data track widths require tighter transverse positioning and transverse rate control of the tape to maintain alignment with the transducer. For fixed position transducer applications, the tape's transverse position must be maintained to keep the reader within the boundaries of the data track. For servo mounted transducer applications, the tape's transverse position tolerance and maximum transverse rate are limited by the servo mechanism's range and frequency response.

Several patents have been issued which disclose guide mechanisms that position the tape by biasing the tape edges against multiple guide surfaces. The U.S. Pat. No. 5,610,787 issued Mar. 11, 1997 to Kunze et al., discloses a fixed tape guide structure that uses four stationary edge guides, two on each side of the transducer. In this arrangement, the inner two guides are on opposite sides of, and immediately next to the transducer. These inner guides fix the position of the tape's upper edge with respect to the transducer. The other two guides are further away from the transducer and are used to bias the tape's upper edge against the two inner guides. Tapes used with this guide mechanism must have sufficient beam strength to allow the tape to be pushed transversely by the guides without the need for additional support. The tapes must also be durable as its edges are subjected to wear sliding against four guides. Finally, the mechanism includes a positioning holder for the transducer making it suitable only for fixed position transducer applications.

The U.S. Pat. No. 5,173,828 issued Dec. 22, 1992 to Tanzer et al., discloses an apparatus that employs three flanged rolling guides on one side of a transducer, with the possibility of one or three more flanged rolling guides on the other side of the transducer. The flanges on the rolling guides provide for transverse tape positioning while the multiple guides form an arcuate path that helps stiffen the tape. This approach subjects the tape edges to wear against up to six guides, and limits the tape path and resulting space claim due to the need to guide the tape along a defined arc.

The U.S. Pat. No. 5,772,143 issued Jun. 30, 1998 to Runyon et al., discloses a tape guide mechanism in which two or three stationary guides direct the tape through a bowed path within the plane of the tape. In one embodiment, two outer guides engage the bottom edge of the tape while the middle guide presses the top edge of the tape downward causing a slight downward bow in the path of the tape. In another embodiment, the two outer guides are tilted or tapered away from each other causing a slight upward bow in the path of the tape. With this mechanism the bottom edge of the tape is subjected to wear against two guides, and the whole tape is subjected to wear as it slides against two or three stationary guides.

DISCLOSURE OF INVENTION

The present invention provides a guide mechanism, a method for making the guide mechanism, and a method for guiding a tape across the face of a transducer that controls the transverse positioning of the tape as it moves across the face of a transducer, while providing low wear to the tape.

Accordingly, it is an object of the present invention to provide a guide mechanism for transversely positioning a tape with respect to a transducer. The guide mechanism comprises two rolling guides positioned symmetrically about the transducer. Each roller has a tapered surface that supports the tape and biases one edge of the tape against a flange at one end of the roller. The two tapered rollers are oriented so that their tapers are in opposite directions. This causes one edge of the tape to be biased against the flange of one roller while the other edge of the tape is biased against the flange of the other roller.

Another object of the present invention is to provide a method for transversely positioning a tape with respect to a transducer. The method comprises rotatably supporting the tape on each side of the transducer as the tape moves across the transducer. On one side of the transducer the tape is biased by a taper in the rotatable support in one transverse direction until its transverse movement is stopped at a predetermined position. On the other side of the transducer the tape is biased by the taper of the rotatable support in the opposite transverse direction until its transverse movement is stopped at another predetermined position.

Another object of the present invention is to provide a method for making the guide mechanism. The method comprises tapering the surface of two rollers with the tapers in opposite directions. Flanges are disposed at the narrow diameter end of each roller. The tapered rollers are rotatably positioned symmetrically about the transducer so that the flange of one tapered roller engages one edge of the tape while the flange of the other roller engages the other edge of the tape.

These and other objects, features and advantages will be readily apparent upon consideration of the following detailed description in conjunction with the accompanying drawings.

BRIEF DESCRIPTION OF DRAWINGS

FIG. 1 is an exploded side elevational view of the tape guide mechanism and its position with respect to a transducer;

FIG. 2 is a side elevational view of one tapered roller;

BEST MODE FOR CARRYING OUT THE INVENTION

Figure 3:
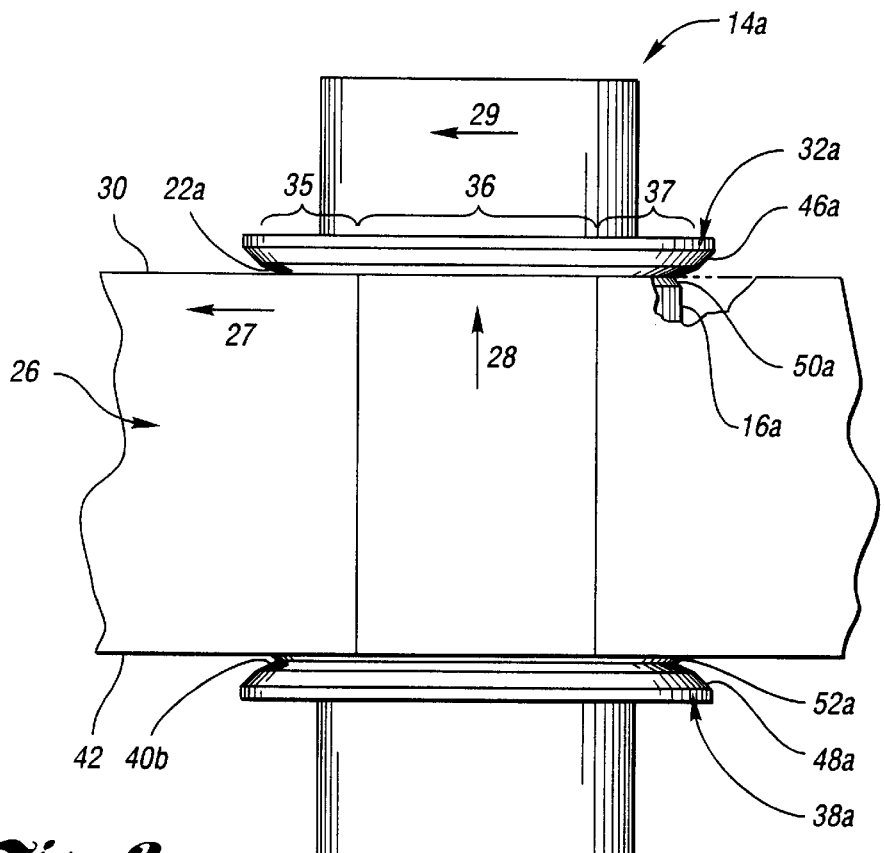
FIG. 3 is a fragmented side elevational view of one tapered roller with a tape across its surface.

FIG. 1 portrays a tape guide mechanism according to the present invention. The mechanism comprises a first tapered roller tape guide 10a and a second tapered roller tape guide 10b positioned symmetrically about a read and write transducer 12. The two tapered roller tape guides are identical, except that the first tapered roller 14a has a conical shaped tapered roller surface 16a with the narrow diameter end 18a above the wide diameter end 20a, while the second tapered roller 14b has a conical shaped tapered roller surface 16b with the narrow diameter end 18b below the wide diameter end 20b. (The taper of rollers 14a and 14b are exaggerated for illustrative purposes.) Tension of the tape (not shown) and the tapered roller surfaces 16a and 16b force the tape against the primary reference edge surfaces 22a and 22b fixing the transverse positioning of the tape. The opposing tapered roller surfaces 16a and 16b balance the moment produced in the tape at the position of the transducer 12. To minimize any tape angular misalignment with the transducer 12, the first and second tapered roller tape guides 10a and 10b are positioned away from the transducer 12.

Figure 4:
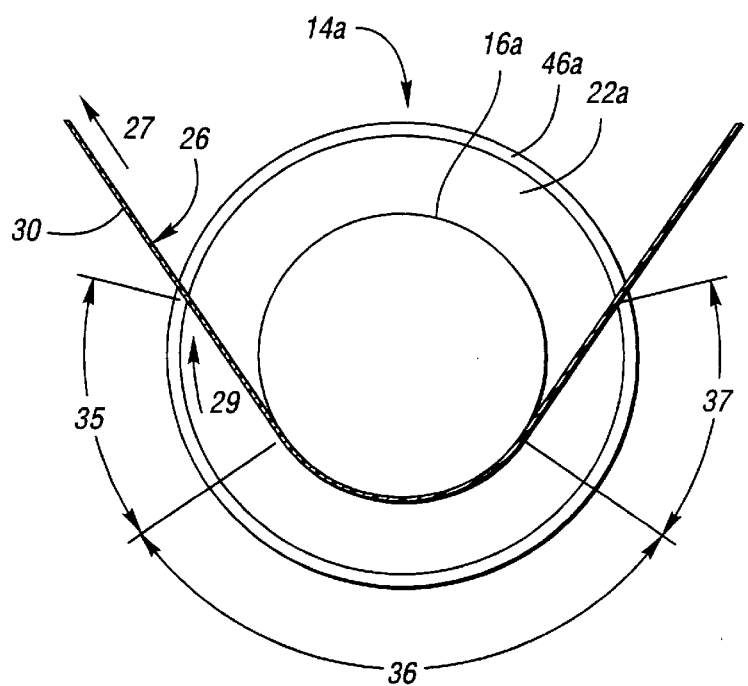
FIG. 4 is a top view of the tapered roller with a tape shown in FIG. 3.

FIG. 2 and FIG. 3 show the first tapered roller 14a as seen from the side. FIG. 4 shows the first tapered roller 14a as seen from on-axis. Tapered roller surface 16a has a shallow taper angle 24. The taper, combined with the tape tension, forces the tape 26 in the transverse direction shown by arrow 28. The transverse motion of the tape 26 is halted when the tape's first edge 30 engages the primary reference edge surface 22a, which is formed on the side of a primary flange 32a facing the tapered roller surface 16a. Primary reference edge surface 22a is tilted away from the tapered roller surface 16a by a fist angle 34 greater than 90 degrees. This is done so that the tape's first edge 30 only engages the primary reference edge surface 22a in the region 36 where the tape 26 is supported against the tapered roller surface 16a. The support in region 36 increases the beam strength of the tape 26 making it less likely to buckle due to the force being exerted on it by the primary reference edge surface 22a. In regions 35 and 37, the tape's first edge 30 is not supported against the tapered roller surface 16a. This results in a lower beam strength in these regions of the tape 26, making it easier to buckle.

FIG. 4 shows additional advantages of tilting the primary reference edge surface 22a. The motion of the tape 26 in the longitudinal direction, shown by arrow 27, is in a different direction than the motion of the first tapered roller 14a in the rotational direction, shown by arrow 29. The tilt of the primary reference edge surface 22a keeps it separated from the tape's first edge 30 in regions 35 and 37. This separation reduces wear of the tape's first edge 30 and wear of the primary reference edge surface 22a caused by the relative motion between the two.

When the first angle 34 is approximately 90 degrees or less, then the contact of the tape's first edge 30 with the outer diameter of the primary reference edge surface 22a in regions 35 or 37 may cause the tape's first edge 30 to lift off this reference edge surface in region 36. A lack of contact between the tape 26 and the primary reference edge surface 22a results in transverse positioning instability.

The friction between the tape's first edge 30 and the primary reference edge surface 22a in regions 35 and 37 works to reduce the torque that the tape 26 imparts to the first tapered roller 14a. The reduced torque, in turn, can cause the first surface 16a of the first tapered roller 14a to move slower in the rotational direction, shown by arrow 29 than the tape 26 moves in the longitudinal direction, shown by arrow 27.

Referring again to FIG. 2 and FIG. 3, the first tapered roller 14a also has a secondary flange 38a at the wide diameter end 20a to help control the position of the tape 26. The secondary flange 38a has a secondary reference edge surface 40a to limit the transverse motion of the tape 26 should it be forced in the opposite direction of arrow 28. The secondary reference edge surface 40a is also tilted away from the tapered roller surface 16a by a second angle 44 greater than 90 degrees. This tilt limits the engagement of the tape's second edge 42 with the secondary reference edge surface 40a to the region 36 where the tape 26 is supported against the tapered roller surface 16a for beam strength. For gross guidance of the tape 26 as it is being threaded into the tape path and approaches the first tapered roller 14a, the flanges 32a and 38a have beveled edges' 46a and 48a.

First tapered roller 14a may be fabricated from a single piece of material to maintain tight control over the relative positioning and angles between the tapered roller surface 16a, the primary reference edge surface 22a, and the secondary reference edge surface 40a. During machining, the corners formed at the intersections of the reference surfaces 22a and 40a with the tapered roller surfaces 16a are slightly rounded due to limitations in the cutting tools. This roundness can cause the tape edges 30 and 42 to curve and buckle when biased against the reference edge surfaces 22a and 40a respectively. To eliminate the roundness, a pair of corner relief notches 50a and 52a are provided in the tapered roller surface 16a. The width 54 of the corner relief notches 50a and 52a are kept at a minimum to provide good transverse support near the tape edges 30 and 42 so that they do not buckle.

Figure 7:
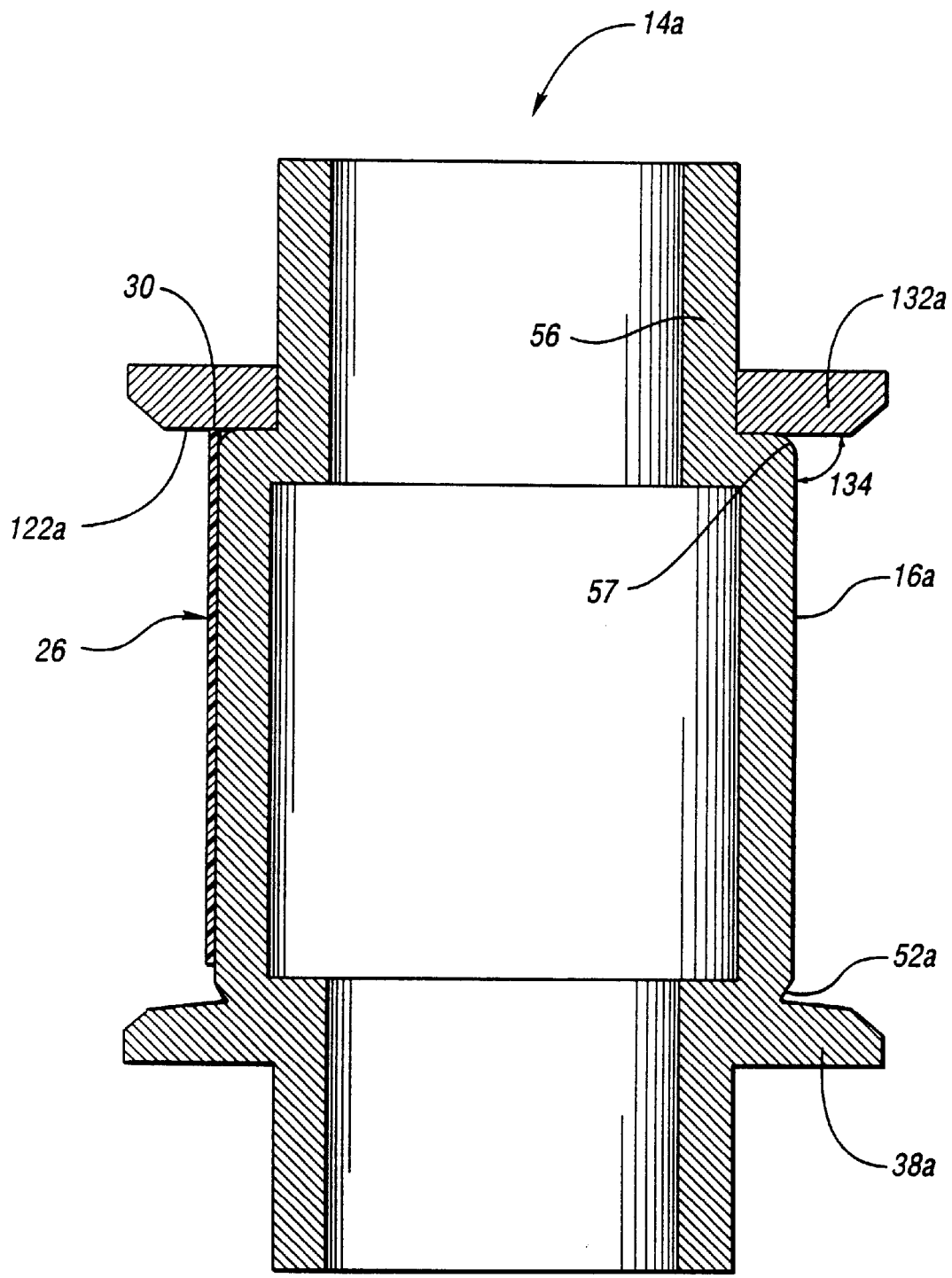
FIG. 7 is a cross sectional view of a tapered roll having an independently fabricated primary flange.

Corner relief notch 50a can be virtually eliminated by fabricating the primary reference flange 32a independently of the body 56 of the first tapered roller 14a. Referring to FIG. 7, the primary reference edge surface 122a is created independent of the tapered roller surface 16a. When the primary reference flange 132a is attached to the body 56 of the first tapered roller 14a, the primary reference edge surface 122a and tapered roller surface 16a form a sharp corner. In practice, edge 57 of the tapered roller surface 16a is slightly rounded to eliminate any burrs. This rounding creates a very small notch that can be held to 0.0127 millimeters (0.005 inches) or less in width. Likewise, the secondary flange 38a could be fabricated independently of body 56 to virtually eliminate the corner relief notch 52a.

The second tapered roller 14b, as shown in FIG. 1, is the mirror image of the first tapered roller 14a, with the taper running in the opposite direction. As the tape 26 passes across the second tapered roller 14b, it is biased downward until the tape's second edge 42 engages the primary reference edge surface 22b.

Several factors must be considered in determining the taper angle 24, the first angle 34, and the second angle 44 for a given application. The taper angle 24 must be sufficient to force the tape edges 30 and 42 into contact with the primary reference edge surfaces 22a and 22b. When the taper angle 24 is too large, the tape edges 30 and 42 will experience excessive forces against the primary reference edge surfaces 22a and 22b causing buckling and damage to the tape 26. When the taper angle 24 is too shallow, then the tape edges 30 and 42 are not always held against the primary reference edge surfaces 22a and 22b causing a loss of transverse position registration. The opposing taper directions of the first tapered roller surface 16a versus the second tapered roller surface 16b also imposes a moment on the tape 26 causing the plane of the tape 26 to twist. When viewing FIG. 1, the tape 26 will undergo a left-handed twist when moving left to right. First edge 30 moves away from the viewer as it approaches the first tapered roller tape guide 10a, while the second edge 42 moves toward the viewer. The opposing taper angle 24 directions must also be taken into account as part of the overall tape path. The first angle 34 and the second angle 44 must take into account the taper angle 24, the direction the tape 26 approaches and departs from the tapered roller surfaces 16a and 16b, and the size of the region 36 where the tape 26 is in contact with the tapered roller surfaces 16a and 16b.

In the preferred embodiment, the taper angle 24 is 0.35 degrees, the primary reference edge surfaces 22a and 22b are tilted 93.0 degrees, and the secondary reference edge surfaces 40a and 40b are tilted 93.0 degrees from the axis of rotation of the tapered rollers 14a and 14b. This produces a first angle 34 of 92.65 degrees and a second angle 44 of 93.35 degrees. The corner relief notch 54 has a maximum width of 0.127 millimeters (0.005 inches) where primary flanges 32a and 32b, and secondary flanges 38a and 38b are fabricated as an integral part of the tapered roller 14a and 14b respectively. In an application of the preferred embodiment, the tape 26 approaches and departs from the tapered roller surface 16a so that region 36 spans an angle of 45 degrees.

Figure 5:
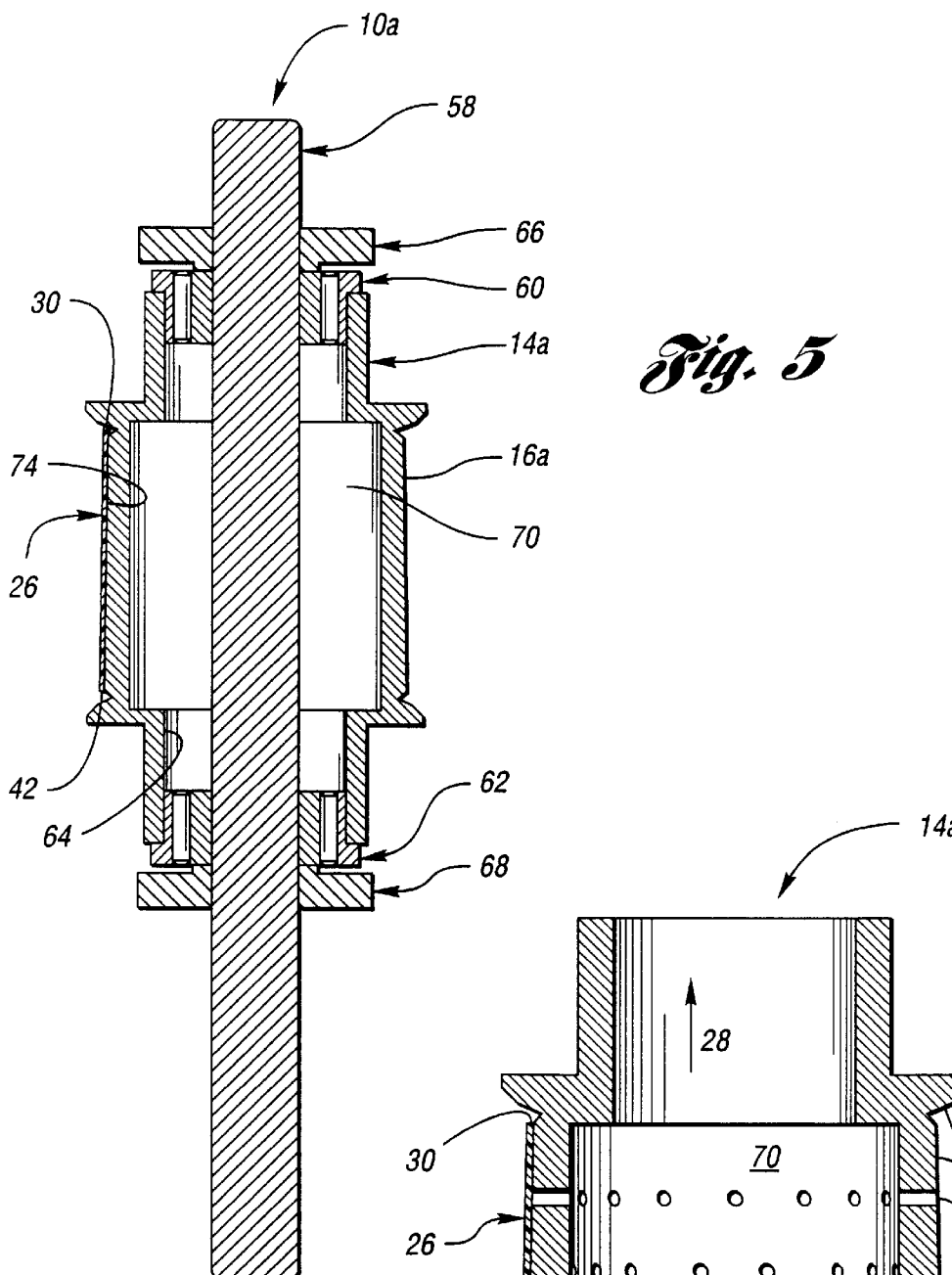
FIG. 5 is a cross sectional view of one tapered roller tape guide with a tape.

FIG. 5 shows a cross-sectional view of the complete first tapered roller tape guide 10a. The first tapered roller 14a is rotatably attached to a shaft 58 by a pair of bearings 60 and 62 situated in an axial aperture 64 running the length of the first tapered roller 14a. The bearings 60 and 62 are filled with a lubricant to provide for low running torque and long life. Rotating rollers are preferred to non rotating rollers for the following reasons. First, the first tapered roller surface 16a engages the magnetic side of the tape 26 in some applications. The rolling motion of the first tapered roller surface 16a results in less relative motion as compared to sliding over a stationary tape guide. This in turn helps reduce the wear on the tape 26 thus preserving any information already recorded, or to be recorded in the magnetic material. Second, as the speed of the tape 26 increases, a thin film of air is trapped between the tape surface 74 and the first tapered roller surface 16a along the majority of the tape width. This air film reduces the friction between the tape surface 74 and the first tapered roller surface 16a making it easier to slide the tape 26 in the transverse direction toward the primary edge surface 22a. The bearings 60 and 62 are spaced as far apart from each other as practical along the shaft 58 to reduce sensitivity to tolerance stack-ups and misalignments. A pair of washers 66 and 68 are mounted to the shaft 58 and are used to pre-load the bearings 60 and 62 to minimize the resonant response of the first tapered rollers 14a induced by the forcing frequency of the tape 26 moving across the first tapered roller surface 16a. The diameters of the washers 66 and 68 are slightly larger than that of the bearings 60 and 62 to form a debris shield over the ends of the bearings 60 and 62. The first tapered roller 14a itself is designed to have a low rotational inertia to allow it to accelerate and decelerate rapidly as the speed of tape 26 ramps up and down. In the preferred embodiment the interior 70 of the first tapered roller 14a and second tapered roller 14b are hollow to reduce their mass.

Figure 6:
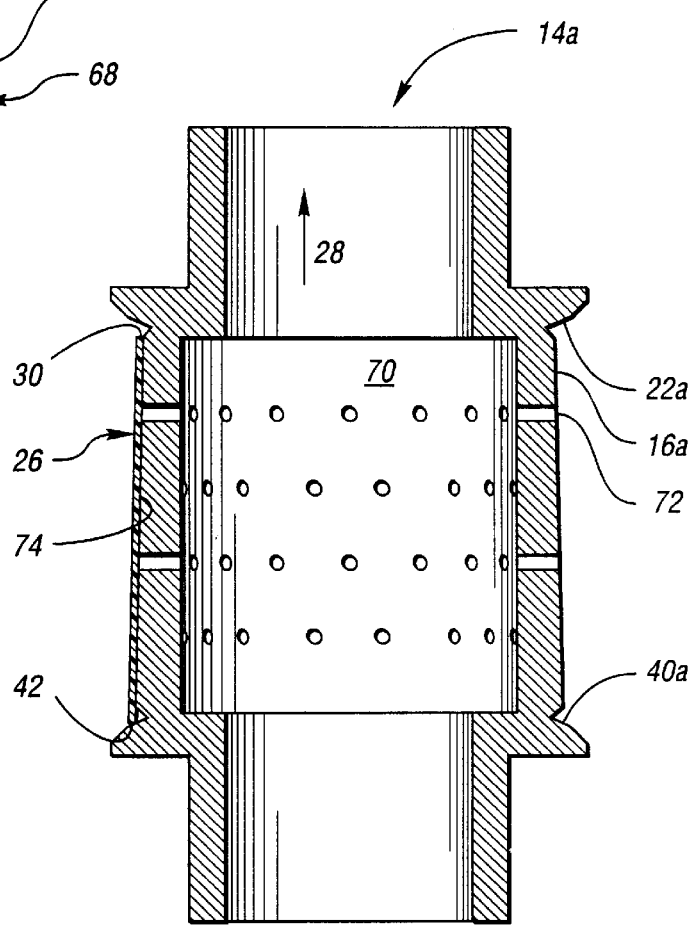
FIG. 6 is a cross sectional view of a tapered roller with air holes for bleeding air away from the tapered roller-tape interface.

FIG. 6 shows the first tapered roller 14a having air bleed holes 72 in the first tapered roller surface 16a. It is desired that the first tapered roller surface 16a move at the same speed as the tape surface 74 to reduce the relative longitudinal motion to minimize wear. This is important because rubbing of the tape surface 74 and tape edges 30 and 42 against the first tapered roller surface 16a, and reference edge surfaces 22a and 40a respectively, causes debris that can interfere with the reading and writing of data, and/or wear on the reference edge surfaces 22a and 40a. In situations where the tape surface 74 is the magnetic side of the tape 26, wear on the magnetic layer can also result in loss of data recorded within. Finally, large transverse displacements of the tape 26 at high frequencies, caused by the wear, affects the registration and stability of tape edges 30 and 42, which in turn can produce problems in the servo tracking system. Since the torque that rotates the first tapered roller 14a comes from the tape motion, the tape surface 74 should remain in contact with the first tapered roller surface 16a, especially during a ramp up and transition to full speed operation. However, as previously mentioned, as the tape speed increases a thin film of air forms between the tape surface 74 and the first tapered roller surface 16a. This air film makes it easier for the tape surface 74 to slide on the first tapered roller surface 16a. Allowing for rotational friction, the first tapered roller surface 16a may rotate slightly slower than the tape speed.

To maintain the tape surface 74 in contact with the first tapered roller surface 16a, a series of air bleed holes 72 channel the air, normally trapped between the tape surface 74 and the first tapered roller surface 16a, into the interior 70 of the first tapered roller 14a. Elimination of the air film has several advantages. First, it permits the tape 26 to apply a higher torque to the first tapered roller 14a. This minimizes rubbing between the tape 26 and the tapered roller 14a by causing the first tapered roller surface 16a to move at the same speed as the tape surface 74. The higher torque also allows for wider variations in the rotational friction of the bearings 60 and 62. Consequently, the amount of lubricant, and the tolerance on the amount of lubricant can be increased, making it easier to manufacturer bearings 60 and 62. Elimination of the air film also causes the tape 26 to be forced in a direction opposite arrow 28. As a result, the primary reference edge surface 22a and the secondary reference edge surface 40a swap rolls. Lateral registration is provided when the tape's second edge 42 engages the secondary reference edge surface 40a.

In a typical design, there are 48 air bleed holes 72 in the first tapered roller surface 16a. The air bleed holes 72 are spaced 30 degrees apart from each other on four bands around the circumference of the first tapered roller surface 16a. Air bleed holes 72 on every other band are staggered by 15 degrees. Each air bleed hole 72 is 0.254±0.0254 millimeters (0.010±0.001 inches) in diameter. Burrs and sharp edges are removed from around the air bleed holes 72 to prevent abrasion to the tape surface 74. Other air bleed paths, such as circumferential grooves, longitudinal grooves, helix grooves, and textured surfaces are not well suited for removing the film of air. Creating such paths sufficiently small and smooth enough not to damage the tape surface 74 is difficult. They often create localized stress in the tape 26 producing indentations that cause problems in reading and writing.

When the air bleed holes 72 are used, the preferred taper angle 24 is 0.2 degrees, the primary reference edge surfaces 22a and 22b are tilted 93.0 degrees, and the secondary reference edge surfaces 40a and 40b are tilted 93.0 degrees from the axis of rotation of the tapered rollers 14a and 14b. This produces a first angle 34 of 92.8 degrees and a second angle 44 of 93.2 degrees.

FIG. 7 shows a cross sectional view of the first tapered roller 14a where the primary flange 132a is fabricated apart from the body 56 of the first tapered roller 14a. This approach virtually eliminates the corner relief notch 50a, which maximizes the support for the tape 26 on first tapered roller surface 16a, which minimizes the probability of buckling the tape's first edge 30 due to non-contact the first tapered roller surface 16a.

Forming primary flange 132a apart from body 56 allows the primary flange 132a to be made from a different material than body 56. Ceramics are commonly used as tape edge guiding surfaces because they are highly wear resistant. A smoothly polished primary edge reference surface 122a helps reduce wear on the tape's first edge 30 and to the primary edge reference surface 122a itself. Current ceramic polishing techniques produce the best surface characteristics when the polished surface is planar. A consequence of such techniques is a planar primary reference edge surface 122a that produces a first angle 134 of slightly less than 90 degrees. To maintain the first angle 134 above 90 degrees, primary flange 132a may be fabricated using other materials that accommodate tapering the primary reference edge surface 122a.

Other approaches are possible, for example, in the air bleed holes 72 embodiment, the tape 26 usually rests against the secondary reference edge surface 40a. Here, the secondary reference edge surface 40a may be a polished planar surface while maintaining the second angle 44 greater than 90 degrees. At the same time, this embodiment allows primary flange 32a to be formed as an integral part of the body 56, complete with a tapered primary reference edge surface 22a and a first angle 34 greater than 90 degrees. Any combination of integrated and independently formed primary flanges 32a and secondary flanges 38a may be used depending upon the application.

While the preferred embodiment of the invention has been shown and described it will be understood by those skilled in the art that many possible variations can be made without departing from the scope of this invention. This invention is not to be limited by the specific embodiments, rather it is defined in the following claims.

What is claimed is:

1. A guide mechanism for controlling a tape's transverse position with respect to a transducer, where the tape has a first edge and a second edge, the guide mechanism comprising two tapered rollers adapted to be positioned symmetrically about the transducer and rotatable, wherein each tapered roller comprises:
    a tapered roller surface having a narrow diameter end and a wide diameter end; and
    a primary flange disposed at the narrow diameter end of the tapered roller surface and having a primary reference edge surface,
    wherein the primary reference edge surface of one tapered roller engages the first edge of the tape and the primary reference edge surface of the other tapered roller engages the second edge of the tape.

2. The guide mechanism of claim 1 wherein the primary reference edge surface of each tapered roller is disposed relative to the tapered roller surface at an angle greater than 90 degrees.

3. The guide mechanism of claim 2 wherein the primary reference edge surface of each tapered roller is disposed relative to the tapered roller surface at approximately 93 degrees.

4. The guide mechanism of claim 1 wherein each tapered roller further has a primary corner relief notch circumscribing the narrow diameter end of the tapered roller surface adjacent to the primary reference edge surface and having a first predetermined width sufficiently narrow to permit the tape to engage the primary reference edge surface without buckling.

5. The guide mechanism of claim 4 wherein the first predetermined width of the primary corner relief notch of each tapered roller does not exceed approximately 0.127 millimeters (0.005 inches).

6. The guide mechanism of claim 1 wherein each tapered roller surface is tapered at approximately 0.4 degrees relative to an axis of rotation.

7. The guide mechanism of claim 1 wherein each tapered roller has a hollow interior.

8. The guide mechanism of claim 1 wherein the primary flange of each tapered roller is a ceramic material.

9. The guide mechanism of claim 1 wherein each tapered roller further comprises a secondary flange disposed at the wide diameter end of the tapered roller surface and having a secondary reference edge surface.

10. The guide mechanism of claim 9 wherein the secondary reference edge surface of each tapered roller is disposed relative to the tapered roller surface at an angle greater than 90 degrees.

11. The guide mechanism of claim 10 wherein the secondary reference edge surface of each tapered roller is disposed relative to the tapered roller surface at approximately 93 degrees.

12. The guide mechanism of claim 9 wherein each tapered roller has a secondary corner relief notch circumscribing the wide diameter end of the tapered roller surface adjacent to the secondary reference edge surface and having a second predetermined width sufficiently narrow to permit the tape to engage the secondary reference edge surface without buckling.

13. The guide mechanism of claim 12 wherein the second predetermined width of the secondary corner relief notch of each tapered roller does not exceed approximately 0.127 millimeters (0.005 inches).

14. The guide mechanism of claim 9 wherein each tapered roller has a hollow interior and a plurality of air bleed holes provided in the tapered roller surface which extend into the hollow interior.

15. The guide mechanism of claim 14 wherein each tapered roller surface is tapered at approximately 0.2 degrees relative to an axis of rotation.

16. The guide mechanism of claim 14 wherein the secondary flange of each tapered roller is a ceramic material.

17. The guide mechanism of claim 14 where the plurality of air bleed holes are positioned along four radial bands circumscribing each tapered toller surface, the plurality of bleed air holes being spaced approximately 30 degrees apart on each band of the four bands, and spaced approximately 15 degrees apart between adjacent bands of the four bands, and wherein each air bleed hole of the plurality of bleed air holes is approximately 0.254 millimeters (0.01 inches) in diameter.

18. The guide mechanism of claim 1 further comprising:
    two shafts;
    four bearings, two bearings each rotatably coupling one shaft of the two shafts to one tapered roller of the two tapered rollers; and four washers, each washer being coaxially mounted to one shaft of the two shafts for pre-loading one respective bearing of the four bearings.

19. The guide mechanism of claim 18 wherein each washer of the four washers extends radially beyond the one respective bearing of the four bearings to form a debris shield.

20. A method for guiding a tape across a transducer having a first side and an opposing second side, the method comprising:

rotatably supporting the tape on the first side and the second side of the transducer, for guiding the tape across the transducer;

rotatably and taperingly biasing the tape on the first side of the transducer in a first direction which is transverse to the transducer, for moving the tape in the first direction;

rotatably stopping the movement of the tape on the first side of the transducer in the first direction at a first position;

rotatably and taperingly biasing the tape on the second side of the transducer in a second direction opposite the first direction, for moving the tape in the second direction; and rotatably stopping the movement of the tape on the second side of the transducer in the second direction at a second position.

21. The method of claim 20 further comprising:

rotatably stopping the movement of the tape on the first side of the transducer in the second direction; and rotatably stopping the movement of the tape on the second side of the transducer in the first direction.

22. A method for making a guidance mechanism for controlling a tape's transverse position with respect to a transducer, where the tape has a first edge and a second edge, the method comprising:

providing two tapered rollers, each tapered roller having a tapered roller surface, a narrow diameter end, and a wide diameter end;

disposing a primary flange having a primary reference edge surface at the narrow diameter end of each tapered roller; and rotatably positioning the two tapered rollers symmetrically about the transducer such that the primary reference edge surface on one tapered roller engages the first edge of the tape, and the primary reference edge surface of the other tapered roller engages the second edge of the tape.

23. The method of claim 22 wherein the primary reference edge surface of each tapered roller is disposed at a first angle relative to the tapered roller surface greater than 90 degrees.

24. The method of claim 22 further comprising forming a primary corner relief notch circumscribing the narrow diameter end of each tapered roller surface adjacent to the primary reference edge surface in response to disposing the primary reference edge surface, each primary corner relief notch having a first predetermined width sufficiently narrow to permit the tape to engage each primary reference edge surface respectively without buckling.

25. The method of claim 24 wherein the first predetermined width of each primary corner relief notch does not exceed approximately 0.127 millimeters (0.005 inches).

26. The method of claim 22 further comprising hollowing the interior of each tapered roller in response to providing the two tapered rollers.

27. The method of claim 22 further comprising disposing a secondary flange having a secondary reference edge surface at the wide diameter end of each tapered roller.

28. The method of claim 27 wherein the secondary reference edge surface of each tapered roller is disposed at a second angle relative to the tapered roller surface greater than 90 degrees.

29. The method of claim 27 further comprising forming a secondary corner relief notch circumscribing the wide diameter end of each tapered roller surface adjacent to the secondary reference edge surface in response to disposing the secondary reference edge surface, each secondary corner relief notch having a second predetermined width sufficiently narrow to permit the tape to engage each secondary reference edge surface respectively without buckling.

30. The method of claim 27 wherein each tapered roller is tapered at approximately 0.4 degrees relative to an axis of rotation.

31. The method of claim 27 wherein the primary reference edge surface of each tapered roller is disposed relative to the tapered roller surface at approximately 93 degrees.

32. The method of claim 27 wherein the second predetermined width of the secondary corner relief notch of each tapered roller does not exceed approximately 0.127 millimeters (0.005 inches).

33. The method of claim 27 further comprising:

hollowing the interior of each tapered roller in response to providing the two tapered rollers; and forming a plurality of air bleed holes in each tapered roller surface extending into each hollow interiors in response to hollowing the interior of each tapered roller.

34. The method of claim 33 wherein each tapered roller surface is tapered at approximately 0.2 degrees relative to an axis of rotation.

35. The method of claim 33 where the plurality of air bleed holes are positioned along four radial bands circumscribing each tapered toller surface, the plurality of bleed air holes being spaced approximately 30 degrees apart on each band of the four bands, and spaced approximately 15 degrees apart between adjacent bands of the four bands, and wherein each air bleed hole of the plurality of bleed air holes is approximately 0.254 millimeters (0.01 inches) in diameter.

36. The method of claim 22 further comprising:

forming an axial aperture through each tapered roller;

attaching a first bearing inside each axial aperture at the narrow diameter end in response to disposing the primary flange at the narrow diameter end of each tapered roller;

attaching a second bearing inside each axial aperture at the wide diameter end in response to disposing the primary flange at the narrow diameter end of each tapered roller;

attaching a shaft inside the first bearing and the second bearing of each tapered roller in response to attaching the first and second bearing inside each aperture; and pre-loading one respective bearing of each first bearing and each second bearing with a washer coaxially mounted to one shaft of the two shafts in response to attaching the shaft inside the first bearing and the second bearing.

37. The method of claim 36 further wherein each washer extends radially beyond the one respective bearing to form a debris shield.

* * * * *